S. W. DAVIS.
ATTACHMENT FOR FISHING FLOATS.
APPLICATION FILED NOV. 17, 1914.

1,149,033.

Patented Aug. 3, 1915.

WITNESSES
L. Hauerstein
J. L. McAuliffe

INVENTOR
Samuel W. Davis
BY
ATTORNEYS

COLUMBIA PLANOGRAPH CO., WASHINGTON, D. C.

UNITED STATES PATENT OFFICE.

SAMUEL WILLIAM DAVIS, OF SAN ANGELO, TEXAS.

ATTACHMENT FOR FISHING-FLOATS.

1,149,033.     Specification of Letters Patent.     Patented Aug. 3, 1915.

Application filed November 17, 1914. Serial No. 872,536.

*To all whom it may concern:*

Be it known that I, SAMUEL W. DAVIS, a citizen of the United States, and a resident of San Angelo, county of Tom Green, and State of Texas, have invented a new and Improved Attachment for Fishing-Floats, of which the following is a full, clear, and exact description.

My invention relates to means for fastening a fishing float on the fishing line.

Objects of my invention are to provide an attachment that may be applied to known forms of floats; to provide an attachment which may be permanently secured to the float and having means for the attachment and detachment of the line; and to provide for the secure retention of the float on the line.

A further object of the invention is to promote convenience in the attachment and detachment of the float.

In carrying out my invention an element is provided preferably tubular and adapted to be fixedly secured in duplicate on the float near the ends, said element having a line-receiving member presenting an entrance opening through which the line may be entered laterally instead of by threading the line through the securing attachment. A co-acting line-retaining device is associated with the first mentioned element, and is movable thereon to co-act with the line-receiving member to permit the ready entrance or removal of the line in attaching or detaching the float.

The invention will be particularly explained in the specific description following.

Figure 1:
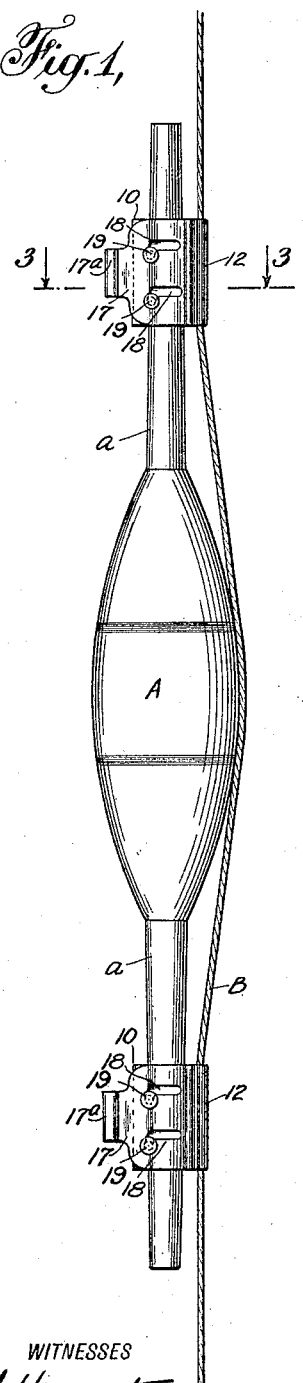
Figure 3:
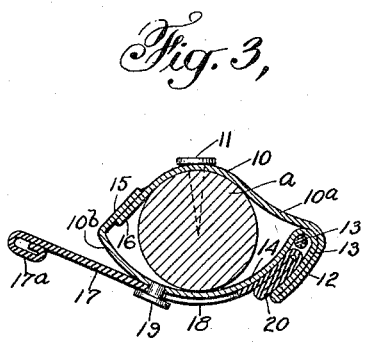
Figure 4:
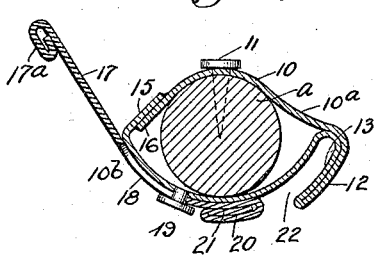
Figure 2:
Figure 5:
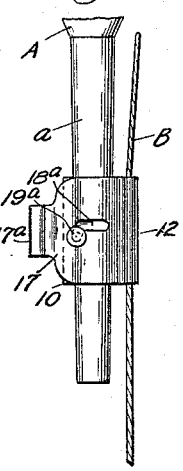

Reference is had to the accompanying drawings forming part of this specification, in which similar characters of reference indicate corresponding parts in all the views, and in which:

Figure 1 is a side elevation of my improved attachment applied to a float and the latter attached to a section of a fishing line; Fig. 2 is a fragmentary detail in side elevation showing the attachment at the opposite side from that illustrated in Fig. 1; Fig. 3 is a transverse section on an enlarged scale on the line 3—3 Fig. 1; Fig. 4 is a view similar to Fig. 3 but showing the line-retaining device in position to permit entrance of the line to the receiving device; and Fig. 5 is a fragmentary view with the parts in the position shown in Figs. 1 and 3, but illustrating another form of the attachment.

In constructing a practical embodiment of my invention in accordance with the illustrated example, a body 10 is provided of a character to be secured to a float A. The float illustrated is of known form, having a buoyant body and elongated terminals $a$.

Preferably I form the body 10 tubular to be slipped on a terminal $a$ and then secured fixedly in position as by a tack 11 or any equivalent fastener. At one side of the body a lateral extension is formed into a hook adapted to receive the fish line B. Advantageously the body is formed of sheet metal, and the outer end of the lateral extension $10^a$ is bent to form the line-retaining hook generally designated by the numeral 12. The material of the body is then again returned on itself at the inside, as at 13, to form a hook of double thickness. From the inturned portion 13 the plate is then extended in arch form as at 14 and to the opposite side to constitute a lateral extension $10^b$, the terminal ends 15, 16, of the plate being overlapped and soldered or otherwise united, if desired. The transversely ranging side 14 of the tubular body forms a broad curved seat for a slide plate 17 which constitutes a retainer for the fish line when the latter is received in the hook 12. Said plate 17 is united to the tubular body at the seat 14 by a slot and pin connection, there being a headed pin or pins 19 on the body and a bayonet slot or slots 18 in the plate 17. The plate 17 for a portion of its length is curved to approximately conform to the curvature of the seat 14, and is carried outwardly beyond the extension $10^b$ to form a handle $17^a$ of reduced width, the edge of the handle being returned one or more times to provide a thickened finger hold. The opposite end 20 which lies adjacent to the hook 12 is thickened, being returned on itself and then returned inwardly beneath the first returned member as at 21. The thickened edge 20 thus provided is adapted to form a substantial closure for the entrance opening 22 at the bill of the hook 12.

By the described construction, one of the attachments having been secured to each terminal $a$ of the float, the line B is entered laterally, the hook 12 being disposed toward the opposite side of the attachment. After the entrance of the fish line to the hook, the plate 17 is slid to bring its thickened end 20 into the hook. The movement permitted is such that the said thickened end 20 will enter in the bill of the hook to lie close to the line. It will be observed that the main arm of a bayonet slot 18 ranges transversely to the float and line and therefore transversely to the body 10, while the other arm of a bayonet slot is oblique to the first arm. The result is that the plate 17 after being slid into engagement with the hook is then moved with a pin 19 engaging the walls of the oblique arm of the slot to give a further movement of the thickened edge 20 toward the fish line. The hook 12 is more or less resilient so that the thickened edge 20 will be forced into place, thereby holding the plate against accidental movement and securely retaining the float on the line.

In the form shown in Fig. 1 it will be seen that two bayonet slots and corresponding pins are employed for each attachment, while in the form shown in Fig. 5 a single bayonet slot is produced. The elements in Fig. 5 are the same in all respects as in the other figures, with the single exception that the single slot 18 is employed and a single pin 19$^a$.

The friction on the line when the float with its described attachments are in place is such that the line will not accidentally move through the guides of its own volition, but the friction may be overcome by sliding the float along the line or pulling on the line to position the float properly according to the depth that it is desired to submerge the hooks.

Having thus described my invention, what I claim as new and desire to secure by Letters Patent, is:

1. An attachment for fishing floats comprising a sheet metal tubular body having a lateral extension bent to constitute a hook transversely disposed in the direction of the opposite side of said body and adapted to receive a fish line, the bill of the hook being resilient and a line-retaining plate slidably mounted on the body transverse to the axis of the tubular body to move toward and from the hook and having a formation at that end adjacent to the hook to be snugly received in the space between the bill and the shank of the hook, and held by the resiliency of the hook.

2. An attachment for fishing floats comprising a sheet metal tubular body having a lateral extension bent to present a transverse hook disposed in the direction of the opposite side of the body, said hook being adapted to receive a fish line and being resilient, and a transversely movable slide on the body, the end of the slide being folded on itself presenting a thickened portion slidably fitting the hook to form a closure therefor and adapted to be held by the resiliency of the hook.

3. An attachment for fishing floats comprising a body adapted to be secured on a float and having a transverse line-receiving hook disposed in the direction of the opposite side and a line-receiving plate on the body having a pin, the said plate having a bayonet slot one arm of which extends transversely of the body in the direction of the hook and the other arm of which is oblique to the first arm, that edge of the plate toward the hook forming a closure of the latter and engaging therewith by movement of the plate corresponding with the direction of the arms of the bayonet slot.

In testimony whereof I have signed my name to this specification in the presence of two subscribing witnesses.

SAMUEL WILLIAM DAVIS.

Witnesses:
N. S. RIVES,
J .H. JORDAN.

Copies of this patent may be obtained for five cents each, by addressing the "Commissioner of Patents, Washington, D. C."